LOGARITHMIC FUNCTION GENERATOR

Filed Feb. 10, 1964

INVENTOR.
ALAN R. PEARLMAN
BY
Rosen & Schiller
ATTORNEYS

United States Patent Office
3,369,128
Patented Feb. 13, 1968

3,369,128
LOGARITHMIC FUNCTION GENERATOR

Alan R. Pearlman, Newton Highlands, Mass., assignor to Nexus Research Laboratory Inc., Canton, Mass., a corporation of Massachusetts Filed Feb. 10, 1964, Ser. No. 343,541
12 Claims. (Cl. 307—229)

ABSTRACT OF THE DISCLOSURE

A device for determining the logarithm of the ratio of two signals, each signal being applied to the input of a respective operational amplifier in which the feedback loop is through the base emitter junction of a transistor. The two transistors are matched for temperature characteristics and maintained at the same temperature. The amplifier outputs can then be summed to obtain the desired signal.

This invention relates to analog function generators and more particularly to electrical devices for deriving an output signal which is linear with respect to a logarithmically variable input.

In certain diodes and transistors, particularly in planar silicon transistors, the emitter current, $I_E$ and base-emitter voltage $V_{BE}$ are logarithmically related over a limited temperature range by $$(1) \qquad V_{BE} \approx V_o + a \log \frac{I_E}{I_O} + b(T_i - T_o)$$

where $V_o = V_{BE}$ measured at a given reference, current $I_o$ and reference temperature $T_o$;
$I_E$=actual emitter current;
$T_i$=actual junction temperature;
$a$=a logarithmic coefficient; and
$b$=a temperature coefficient.

In practice for silicon transistors, typically $a \approx 60$ mv./decade and $b \approx 2$ mv./° C. at room temperature. The relationship expressed in Equation 1 is restricted to values of $I_E$ appreciably larger than the junction saturation current $I_s$; however, for well-made planar silicon transistors $I_s$ is very nearly the same as the emitter-base leakage current, $I_{EBO}$.

Based on the foregoing logarithmic relationship, J. F. Gibbons and H. S. Horn, in "A Circuit with Logarithmic Transfer Response Over 9 Decades," Digest of Technical Papers, 1963 Solid-State Circuit Conference, IEEE, p. 38, have described circuitry which will accept an input and provide an output signal which is linear with respect to the logarithm of the input. Such a circuit however, has, in practice, proven quite unstable in that it is subject to a large thermal drift of operating point, usually of 3% per decade per degree Centigrade.

A principal object of the present invention is to provide a novel electrical circuit which is adapted to provide an output linearly related to the logarithm of the input. Another important object of the present invention is to provide such an electrical circuit wherein the output is the ratio of a pair of input currents or voltages.

Other objects of the present invention are to provide such circuits which exhibit improved temperature stability; to provide such circuits whereby one can obtain a voltage output which is a substantially linear as a function of the logarithm, over a range at least four decades, of the ratio of a pair of input signals; to provide an analog logarithm-to-linear converter device comprising a pair of matched semiconductor elements each having a diode junction characterized in that a voltage across the junction is a substantially linear function of the logarithm of the junction forward current, and operational amplifier means for controlling the input current signals to each of said junctions; and to provide a device of the type described wherein said semiconductor devices each exhibit a forward gain greater than unity.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and the objects of this invention, reference should be made to the following detailed description taken in connection with the drawings wherein.

The principles of the present invention are embodied in a circuit which employs the log-linear relationship between the output current and voltage across the diode junction of a semiconductor device, particularly a planar silicon transistor, to provide a log-linear relationship of improved thermal stability between input and output of an electronic module. Thus, the circuit of the present invention can be described as a non-linear, i.e. logarithmic, function generator. Where the input consists of a pair of signals and the output if thus linearly related to the logarithm of the ratio of the input signals, the present invention can be termed a logarithmic ratiometric function generator. Operational amplifiers, well known in the art, are employed to sense the forward voltage drops across the respective diode junctions and also to provide isolation between input and output signal paths. This structure tends also to minimize the input impedance seen by the signals, and provides power amplification to drive subsequent circuitry thus permitting measurement of voltage signals of small magnitude with respect to the aforesaid voltage drops, and of current signals small with respect to the drive requirements of the subsequent circuitry.

Figure 1:
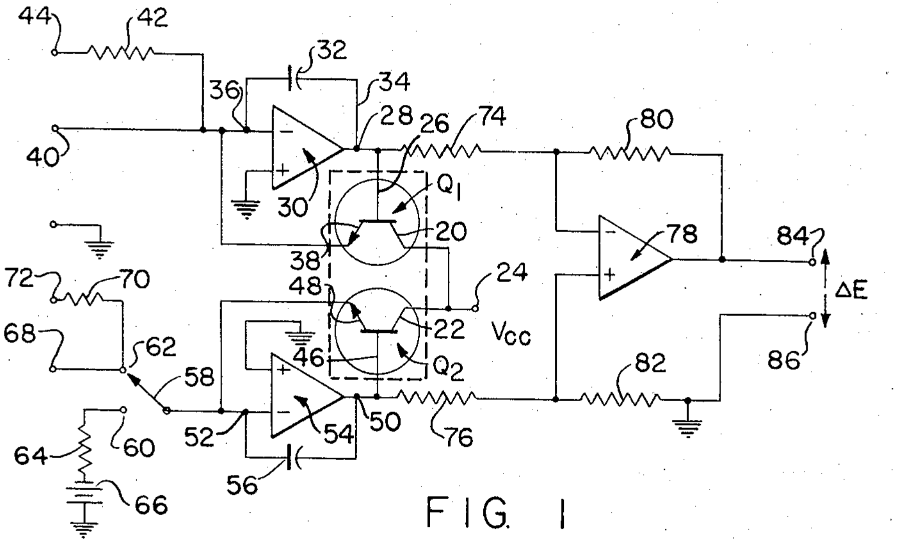
FIG. 1 is a schematic circuit diagram, partly in block form, illustrating one embodiment of the present invention.

The present invention as shown in FIG. 1, comprises a pair of diode-junction-containing devices, such as silicon planar transistors $Q_1$ and $Q_2$, which are preferably matched as hereinafter described to show substantially the same junction characteristic i.e. $V_{EB}$ and $I_E$, with respect to one another over a given temperature range, for example from 10° C. to 80° C. In order to insure that the transistors will be exposed substantially simultaneously to the same ambient temperature so that the charactristics of each optimally track one another with ambient temperature changes, it is preferred that they are potted quite closely to one another, as by having their cases in contact, in a highly thermally conductive plastic as shown in broken line surrounding transistors $Q_1$ and $Q_2$. The collectors 20 and 22 of transistors $Q_1$ and $Q_2$ respectively are connected to one another as at terminal 24.

Base 26 of transistor $Q_1$ is coupled directly to output terminal 28 of operational amplifier 30 which, in the form shown, has a small capacitive impedance 32 (e.g. 100 pf.) in series in a negative feedback loop 34 connecting its output terminal 28 and summing junction 36 at its input. Emitter 38 of transistor $Q_1$ is connected to summing junction 36 at the input of amplifier 30. This small capacitance 32 is intended to compensate for capacitance between ground and junction 36, and thus reduce any high frequency noise. In the form shown summing junction 36 is connected directly to first current input terminal 40 and also is connected through resistance 42 to first voltage input terminal 44. It will be apparent that the dynamic resistance across the base-emitter junction of transistor $Q_1$ provides the resistive component in a negative feedback loop around amplifier 30.

In like manner, base 46 and emitter 48 of transistor $Q_2$ are respectively connected to output terminal 50 and input terminal or summing junction 52 of operational amplifier 54. Another negative feedback loop between terminal 50 and junction 52 is through series capacitive impedance 56 of very small value, serving a purpose comparable to impedance 38.

Summing junction 52 is connectable through switch 58 to either terminal 60 or terminal 62. Terminal 60 is coupled to ground through a substantially constant reference current source which as shown as comprising resistor 64 connected to ground through battery 66. Terminal 62 is connected directly to second current input terminal 68 and also is connected through resistance 70 to second voltage input terminal 72. The provision of switch 58 confers flexibility upon the embodiment of FIG. 1 in its operation, for its allow selection of the input to amplifier 54 from amongst unknown voltage and current signals which can be respectively applied to terminals 72 and 68, and a precisley known reference current from terminal 60.

In the embodiment of FIG. 1, the bases of transistors $Q_1$ and $Q_2$ are respectively connected through resistors 74 and 76 to respective inputs of third operational amplifier 78 which has a resistive impedance 80 in its negative feedback loop. One of the inputs to amplifier 78, for example, the input connected to resistor 76, is also grounded through another resistance 82. The output of amplifier 78 is connected to output terminal 84.

In operation, terminal 24 is connected to a source of potential Vcc for biasing the collectors of the transistors at a substantially constant value which is preferably equal to or greater than the maximum expected base-emitter voltage. Assuming current inputs $I_1$ and $I_2$ applied concurrently and respectively between input terminals 40 and ground and between input terminal 68 and ground (with switch 58 coupled to terminal 62), and base-emitter voltages for transistors $Q_1$ and $Q_2$ are respectively (from Equation 1)

(2)
$$V_{BE_1}=V_{01}+a_1 \log \frac{I_{E1}}{I_{01}}+b_1(Ti-To)$$

and (3)
$$V_{BE_2}=V_{02}+a_2 \log \frac{I_{E2}}{I_{02}}+b_2(Ti-To)$$

Since we can define $a_2=a_1$ $$\left[1+\frac{(a_2-a_1)}{a_1}\right]$$

and $(V_{BE_2})-(V_{BE_1})=\Delta E$, one finds, upon subtracting Equation 2 from Equation 3, that (4)
$$\Delta E=V_{02}-V_{01}+a_1 \log \frac{I_{01}}{I_{02}}+a_1 \log \frac{I_{E2}}{I_{E1}} +(a_2-a_1) \log \frac{I_{E2}}{I_{02}}+(b_2-b_1)(Ti-To)$$

A single substantially constant voltage term $V_D$ can be substituted in the above by defining as follows:

$$V_D=V_{02}-V_{01}+a_1 \log \frac{I_{01}}{I_{02}}$$

Thus:

(5)
$$\Delta E=V_D+a_1 \log \frac{I_{E2}}{I_{E1}}+(a_2-a_1) \log \frac{I_{E2}}{I_{02}} +(b_2-b_1)(Ti-To)$$

Within the state of the art, transistors can be easily matched such that $$\frac{a_2-a_1}{a_{av.}}\approx 0.01, \text{ where } a_{av.}=\frac{a_2+a_1}{2}$$

and $$\frac{b_2-b_1}{a_{av.}}\approx 0.0002 \text{ of a decade/}^\circ\text{ C.}$$

These criteria for selection presuppose constancy for $a_1$ and $a_2$. In fact, these latter coefficients are thermally variable and roughly can be considered constant only within an error of about 10% over a range of approximately 30° C. around room temperature. However, with respect to the coefficients $(a_2-a_1)$ and $(b_2-b_1)$ of Equation 5 the assumption of constancy is quite valid as a good approximation in that logarithmic conformity can thus be achieved within 1% or less per decade, and thermal drift from operating point becomes a second-order error which can be neglected. Thus, Equation 5 can be further simplified as follows:

(6)
$$\Delta E=V_D+a_1 \log \frac{I_{E2}}{I_{E1}}$$

It will be appreciated that ΔE is the potential appearing from base to base of the transistors and hence, by virtue of resistors 74, 76, 80 and 82 (all preferably matched in value) drives the differential input signal to amplifier 78. The latter, operating as a subtractor, will provide a single-ended output at terminal 84 referred to ground, as a terminal 86. Here, the temperature dependence of $a_1$ introduces thermal error into only the slope of the response, which can be compensated for in the measuring device used to determine the value of ΔE.

Alternatively, one can simply measure ΔE with an appropriate measuring device coupled across bases 46 and 26. The value of ΔE thus measured will vary linearily according to the logarithm, of the ratio of the two input current signals. If one of the current input signals is a precisely known value $I_{REF}$ (as by connecting switch 58 to terminal 60 to couple battery 66 and resistor 64 to the input of amplifier 54) then ΔE will in effect bear a log-linear relationship to the unknown or test input to amplifier 30.

It will be apparent that either current or voltage signals can be employed as inputs by application to appropriate ones of terminals 40, 44, 68 and 72. The circuit configuration shown is intended for use with negative input signals (collector bias voltage $V_{cc}$ at terminal 24 being positive), but as well known in the art can readily be rearranged to accept signals of positive or even mixed polarities.

Figure 3:
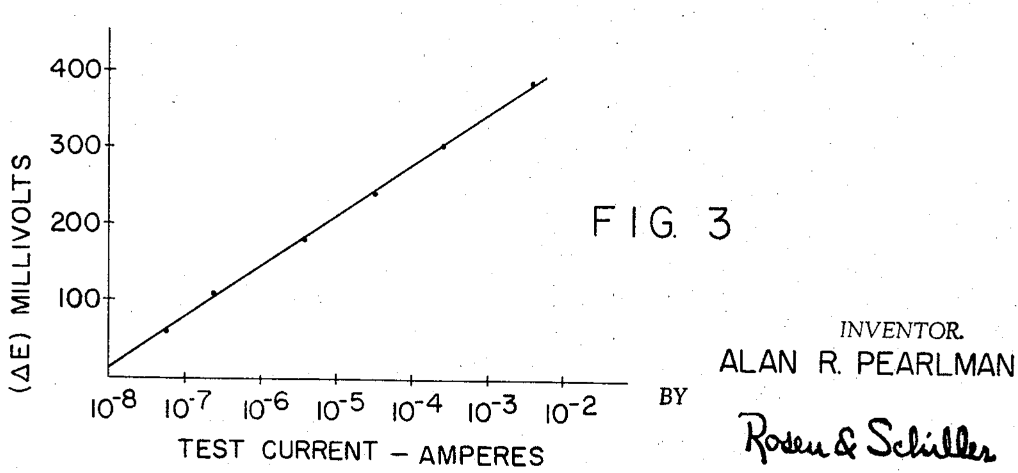
FIG. 3 is a graphical semi-log representation of the relationship of output signals to input signals in the operation of the embodiment of FIG. 1 in a particular manner.

An example of the log-linear relationship provided by the circuit of FIG. 1 having a reference current input to amplifier 54 is illustrated in FIG. 3 in which the ordinates are a ΔE in millivolts in linear increments, and the abscissa is the test current in decades or logarithmic increments, in amperes. In this example, the relationship covers approximately a 5½ decade range with the negligible deviation from straightness.

Figure 2:
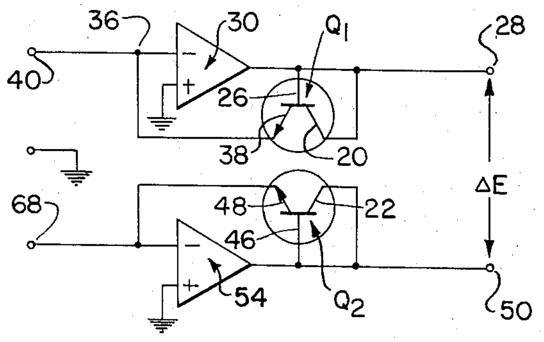
FIG. 2 is schematic circuit diagram, partly in block form, illustrating yet another embodiment of the principles of the present invention.

While the logarithmic relationship provided by the present invention arises out of the nature of the diode junctions, for example in $Q_1$ and $Q_2$ of FIG. 1, it is preferred to employ transistors instead of diodes. Actually, as shown in FIG. 2 (wherein like numerals denote like parts) an otherwise simplified embodiment of the invention can be formed with the two planar silicon transistors $Q_1$ and $Q_2$ so arranged that their bases are tied in direct short circuit to their respective collectors. This configuration is advantageous in that a separate collector bias supply is no longer required. In effect the transistors are then simply diodes. It is possible thus to replace transistors $Q_1$ and $Q_2$ with appropriately poled diodes. However, within the present state of the art, transistors in the configuration shown in FIG. 2 are, for the purposes of this invention, superior in most respects to present diodes, although operating as such.

The use of transistors with greater than unity gain as in FIG. 1 has at least one distinct advantage over the use of transistors as diodes as in FIG. 2. With transistors exhibiting sufficient gain, one can pass more current through the transistors than the input amplifiers can supply; the signal current range and the absolute currents are not then limited strictly by amplifier capabilities.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An analog logarithmic ratiometric device comprising, in combination:

first and second operational amplifiers having respective input terminals adapted to have first and second input signals impressed concurrently thereon;

a ground terminal constituting a common ground with respect to both input terminals of said amplifiers;

first and second transistors, each having first, second and control terminals and being characterized in having between said first terminal and said control terminal, a transistor junction with operating characteristics such that the voltage across said junction is substantially linear with respect to the logarithm of a forward input current applied to said first terminal, said transistor having a forward current gain greater than unity between the first and control terminals;

means for maintaining said transistors at substantially the same ambient temperature;

means connecting said transistor junction of said first transistor so that only said transistor junction thereof is in series in a negative feedback loop around said first amplifier; and means connecting said transistor junction of said second transistor so that only said transistor junction thereof is in series in a negative feedback loop around said second amplifier;

whereby when said signals are impressed on the input terminals of said amplifiers, the voltage between the outputs of said amplifiers is substantially linear with respect to the logarithm of the ratio of said input signals.

2. A device as defined in claim 1 wherein said transistors are matched to one another so that variations in said ambient temperature over a predetermined temperature range produce substantially the same changes in said operating characteristics of both of said transistors.

3. A device as defined in claim 1 including means for summing the output voltages of said amplifiers so as to derive a difference voltage referred to said common ground.

4. A device as defined in claim 3 wherein said means for summing said output voltages is connected to the outputs of said amplifiers so as to derive a difference voltage referred to said common ground.

5. A device as defined in claim 1 including a third operational amplifier having a pair of inputs, one of which includes a summing junction connected through an impedance to the output of said first amplifier and connected to the output of said third amplifier by a resistive negative feedback loop, the other of said inputs of said third amplifier being connected through an impedance to the output of said second amplifier and connected through another impedance to said common ground.

6. A device as defined in claim 1 including a source of substantially constant reference current, and means for connecting said source to an input terminal of one of said amplifiers so as to provide one of said input signals, whereby when said other signal is impressed on the other of said amplifier input terminals, the voltage between the outputs of said amplifiers is substantially linear with respect to the logarithm of said other signal.

7. An analog logarithmic ratiometric device comprising, in combination:

first and second operational amplifiers having a respective output terminal and having respective input terminals adapted to have first and second input signals impressed concurrently thereon;

a ground terminal constituting a common ground with respect to both input terminals of said amplifiers;

first and second transistors, each having emitter, collector and base electrodes and being characterized in having base-emitter junction operating characteristics such that the base-emitter voltage is substantially linear with respect to the logarithm of the emitter current, means for maintaining said transistors at substantially the same ambient temperature;

means connecting the base and emitter electrodes of said first transistor to corresponding ones of the output and input terminals of said first amplifier; and means connecting the base and emitter electrodes of said second transistor to corresponding ones of the output and input terminals of said second amplifier;

whereby when said signals are impressed on the input terminals of said amplifiers, the voltage between the outputs of said amplifiers is substantially linear with respect to the logarithm of the ratio of said input signals.

8. A device as defined in claim 7 wherein the collectors of said transistors are adapted to have biasing voltage applied thereto, and said transistors are characterized in having forward base-emitter current gains greater than unity.

9. A device as defined in claim 8 wherein said transistor collectors are connected to a common terminal, including a source of substantially constant voltage connected to said common terminal for biasing said collectors.

10. A device as defined in claim 8 wherein said transistors are silicon transistors.

11. A device as defined in claim 8 including a source of substantially constant reference current, and means for connecting said source to an input terminal of one of said amplifiers so that said reference current constitutes one of said input signals.

12. An analog logarithmic ratiometric device comprising, in combination;

first and second operational amplifiers having respective input terminals adapted to have first and second input signals impressed concurrently thereon;

a ground terminal constituting a common ground with respect to both input terminals of said amplifiers;

first and second transistors each having first, second and control terminals and being characterized in having between said first and control terminals a transistor junction with operating characteristics such that $$V \approx V_0 + a \log \frac{I_1}{I_0} + b(T_1 - T_0)$$

where

V is the voltage across said junction;

$V_0 = V$ at a predetermined reference forward current value $I_0$ flowing through said junction at a predetermined reference temperature $T_0$;

$I_1$ is the actual forward current flowing;

$T_1$ is the actual junction temperature;

$a$ and $b$ are approximately constant different coefficients, each of which is substantially the same for each of said transistors;

means for maintaining said elements at substantially the same ambient temperature, and the forward current gain between said first and control terminals is greater than unity;

means connecting only said junction of said first transistor in series in a negative feedback loop between the output and the input summing junction of said first amplifier; and means connecting only said junction of said second transistor in series in a negative feedback loop between the output and the input summing junction of said second amplifier;

whereby when said signals are impressed on the input terminals of said amplifiers, the voltage ΔV between the output of said amplifiers is such that $$\Delta V \approx K + a \log \frac{I_F}{I_S}$$

where $I_F$ and $I_S$ are respectively said first and second signals and K is a substantially constant value.

References Cited

UNITED STATES PATENTS

| | | | |
|---|---|---|---|
| 3,058,057 | 10/1962 | Frost | 328—145 |
| 3,108,197 | 10/1963 | Levin | 328—145 |
| 3,128,377 | 4/1964 | Goddard | 328—145 |
| 3,152,250 | 10/1964 | Platzer | 328—145 |
| 3,237,028 | 2/1966 | Gibbons | 328—145 |
| 3,255,417 | 6/1966 | Gottlieb | 328—145 |

OTHER REFERENCES

Handbook of Automation Computation and Control by Grabbe, Ramo and Wooldridge, volume 2, pp. 23–09. Feb. 7, 1959.

ARTHUR GAUSS, *Primary Examiner.*

R. H. EPSTEIN, J. D. FREW, *Assistant Examiners.*